United States Patent
Surana et al.

(10) Patent No.: US 10,936,232 B1
(45) Date of Patent: Mar. 2, 2021

(54) METHODS AND APPARATUS FOR DATA REPARTITIONING

(71) Applicant: Walmart Apollo, LLC, Bentonville, AR (US)

(72) Inventors: Ashish Surana, Bangalore (IN); Navinderpal Pal Singh Brar, Bengaluru (IN); Deepak Goyal, Bangalore (IN); Giridhar Addepalli, Bangalore (IN); Sébastien Péhu, Novato, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/548,628

(22) Filed: Aug. 22, 2019

(51) Int. Cl.
*G06F 3/06* (2006.01)

(52) U.S. Cl.
CPC .......... *G06F 3/0644* (2013.01); *G06F 3/0604* (2013.01); *G06F 3/0652* (2013.01); *G06F 3/0673* (2013.01)

(58) Field of Classification Search
CPC ..... G06F 3/0644; G06F 3/0604; G06F 3/0652
USPC .......................................................... 711/173
See application file for complete search history.

(56) References Cited

U.S. PATENT DOCUMENTS

| | | | | |
|---|---|---|---|---|
| 5,652,863 A | * | 7/1997 | Asensio | G06F 3/04847 711/173 |
| 8,341,376 B1 | * | 12/2012 | Blackwell | G06F 3/067 711/170 |
| 2003/0126309 A1 | * | 7/2003 | Camble | G06F 21/78 719/321 |
| 2012/0143873 A1 | * | 6/2012 | Saadat | G06F 16/2228 707/741 |

* cited by examiner

*Primary Examiner* — Than Nguyen
(74) *Attorney, Agent, or Firm* — Duane Morris LLP; Manita Rawat

(57) ABSTRACT

This application relates to apparatus and methods for automatically determining and providing digital advertisements to targeted users. In some examples, a computing device receives campaign data identifying items to advertise on a website, and generates campaign user data identifying a user that has engaged all of the items on the website. The computing device may then determine a portion of the users based on a relationship between each user and the campaign user data, and may determine user-item values for each of the items for each user of the portion of users, where each user-item value identifies a relational value between the corresponding user and item. The computing device may then identify one or more of the items to advertise to each user of the portion of users based on the user-item values, and may transmit to a web server an indication of the items to advertise for each user.

20 Claims, 11 Drawing Sheets

METHODS AND APPARATUS FOR DATA REPARTITIONING

TECHNICAL FIELD

The disclosure relates generally to data storage management and, more specifically, to the partitioning of data in data storage systems.

BACKGROUND

At least some retailers sell goods or services to customers at store locations. Some retailers additionally, or alternatively, sell goods or services to customers on one or more websites, such as a website for the retailer or an online marketplace, for example. Regardless of whether purchased in a store or online, the purchases typically generate data, such as transaction data identifying and characterizing the purchases. For example, transaction data for a purchase may include an identification of the items purchased, the cost of the items, the payment form, and the date of the transaction. The transaction data may be stored in a data storage system. Data storage systems may include a plurality of clusters, where each cluster includes a plurality of machines (known as nodes). The available memory provided by a cluster may be divided into a plurality of logical partitions, where each logical partition is associated with a maximum amount of data storage capacity (e.g., memory). Typically, a partition is assigned to one machine, and that machine services reads from, or writes to, the partition.

As the number of transactions increase, the amount of data storage required to store the transaction data increases. In at least some examples, to allow for increased data storage capacity, data storage systems may add logical partitions by, for example, adding additional computing machines. As additional storage capabilities are added to a data storage system, the currently stored data typically requires repartitioning among the existing and newly available partitions. The process of repartitioning, however, may cause logical partitions to be unavailable for memory access. The unavailability of the partitions may cause delays, such as processing and transaction delays. Moreover, the adding of additional storage capacities (e.g., computing machines) to increase the number of logical partitions involve costs as well as time to repartition the data. As such, there are opportunities to address current systems and methods of repartitioning data, such as transaction data, in data management systems.

SUMMARY

The embodiments described herein are directed to systems and methods of automatically repartitioning data within one or more clusters. The embodiments may allow for an efficient repartitioning of data among multiple logical partitions of one or more clusters, thereby reducing the amount of time needed to repartition the data. In addition, the embodiments may allow redundant data to be available in the event one or more logical partitions become unavailable. As such, the embodiments may decrease the chances of service unavailability (e.g., the ability to make a purchase transaction online). Persons of ordinary skill in the art having the benefit of these disclosures may recognize additional advantages as well.

In accordance with various embodiments, exemplary systems may be implemented in any suitable hardware or hardware and software, such as in any suitable computing device executing instructions. For example, in some embodiments, a computing device is communicatively coupled to a plurality of first memory partitions and a plurality of second memory partitions. The computing device is configured to determine at least one available memory partition from the plurality of second memory partitions for each of the plurality of first memory partitions. The computing device may also be configured to delete at least a portion of data in each of the plurality of first memory partitions where, after the deletion, there remains a remaining portion of data in each of the plurality of first memory partitions. The computing device may further be configured to store at least a portion of the remaining portion of data in each of the plurality of first memory partitions in the determined at least one available memory partition for each first memory partition. The computing device may also be configured to assign a partition identification (ID) to each of the plurality of first memory partitions, and configure the determined at least one available memory partition for each of the plurality of first memory partitions as a redundant memory partition.

In some examples, the plurality of first memory partitions comprise a plurality of active memory partitions and a plurality of redundant partitions, wherein each redundant memory partition of the plurality of redundant memory partitions corresponds to an active memory partition of the plurality of active memory partitions. The computing device may be further configured to delete at least the portion of data in each of the plurality of active memory partitions where, after the deletion, there remains the remaining portion of data in each of the plurality of active memory partitions. The computing device may be further configured to delete at least the portion of data in each of the plurality of redundant partitions corresponding to the remaining portion of data in each of the plurality of active memory partitions.

In some embodiments, a method is provided that includes determining at least one available memory partition for each of a plurality of first memory partitions. The method may also include deleting at least a portion of data in each of the plurality of first memory partitions where, after the deletion, there remains a remaining portion of data in each of the plurality of first memory partitions. The method may further include storing at least a portion of the remaining portion of data in each of the plurality of first memory partitions in the determined at least one available memory partition for each first memory partition. The method may also include assigning a partition identification (ID) to each of the plurality of first memory partitions, and configuring the determined at least one available memory partition for each of the plurality of first memory partitions as a redundant memory partition.

In some examples, the plurality of first memory partitions comprise a plurality of active memory partitions and a plurality of redundant partitions, wherein each redundant memory partition of the plurality of redundant memory partitions corresponds to an active memory partition of the plurality of active memory partitions. The method may then further include deleting at least the portion of data in each of the plurality of active memory partitions where, after the deletion, there remains the remaining portion of data in each of the plurality of active memory partitions. The method may also include deleting at least the portion of data in each of the plurality of redundant partitions corresponding to the remaining portion of data in each of the plurality of active memory partitions.

In yet other embodiments, a non-transitory computer readable medium has instructions stored thereon, where the instructions, when executed by at least one processor, cause a computing device to perform operations that include determining at least one available memory partition for each of a plurality of first memory partitions. The operations may also include deleting at least a portion of data in each of the plurality of first memory partitions where, after the deletion, there remains a remaining portion of data in each of the plurality of first memory partitions. The operations may further include storing at least a portion of the remaining portion of data in each of the plurality of first memory partitions in the determined at least one available memory partition for each first memory partition. The operations may also include assigning a partition identification (ID) to each of the plurality of first memory partitions, and configuring the determined at least one available memory partition for each of the plurality of first memory partitions as a redundant memory partition.

In some examples, the plurality of first memory partitions comprise a plurality of active memory partitions and a plurality of redundant partitions, wherein each redundant memory partition of the plurality of redundant memory partitions corresponds to an active memory partition of the plurality of active memory partitions. The operations may then further include deleting at least the portion of data in each of the plurality of active memory partitions where, after the deletion, there remains the remaining portion of data in each of the plurality of active memory partitions. The operations may also include deleting at least the portion of data in each of the plurality of redundant partitions corresponding to the remaining portion of data in each of the plurality of active memory partitions.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
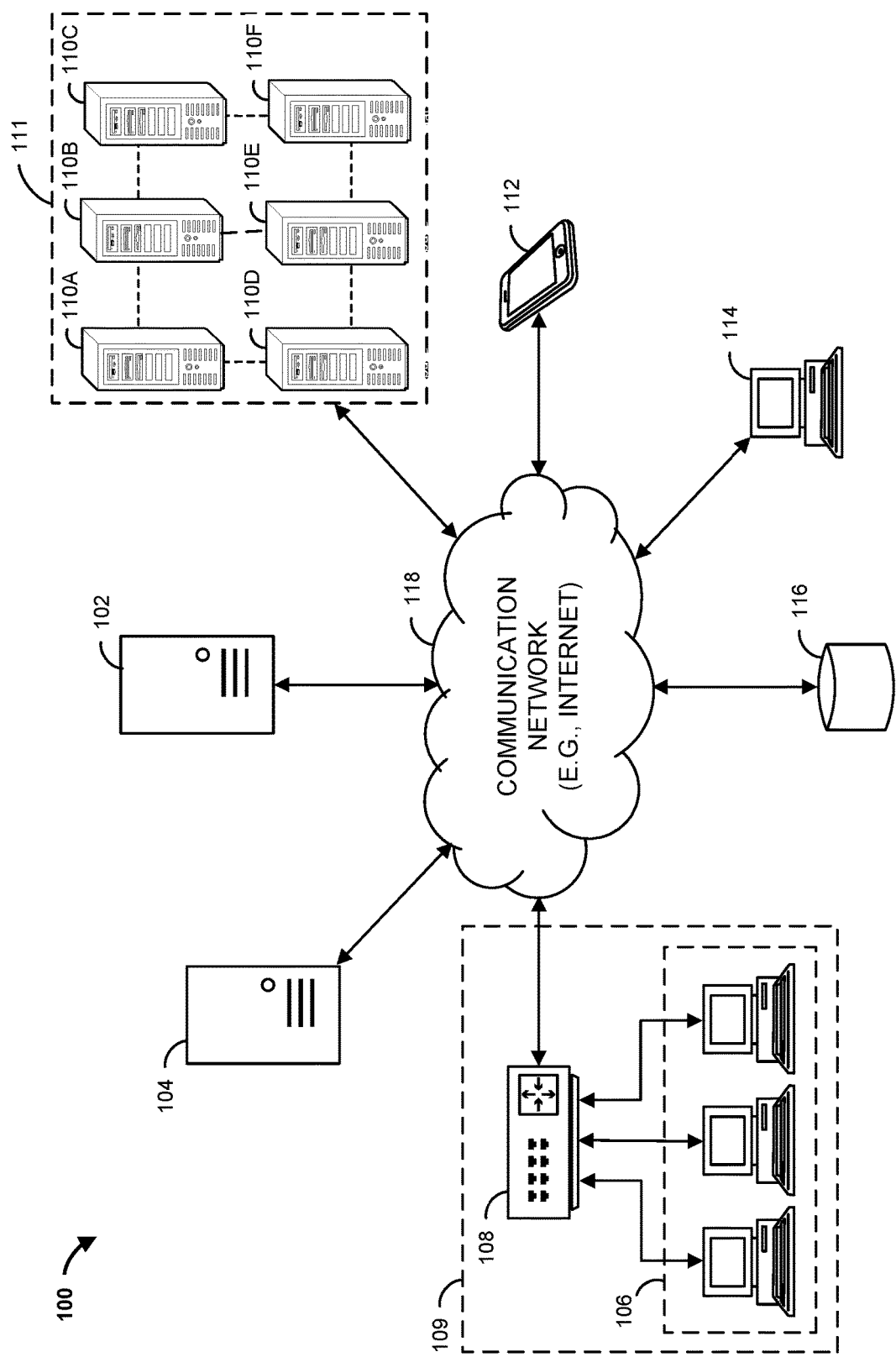
FIG. 1 is a block diagram of a data management system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a data management system 100 that includes a storage management device 102 (e.g., a server, such as an application server), a web server 104, workstation(s) 106, database 116, storage servers 110, and multiple customer computing devices 112, 114, each communicatively coupled to network 118. Storage management device 102, workstation(s) 106, web server 104, storage servers 110, and customer computing devices 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, storage management device 102 and storage servers 110 can be a computer, a workstation, a laptop, a server such as a cloud-based server, or any other suitable computing device. Storage servers 110 may include memory storage capability. For example, each storage server 110 may be a server operably coupled to one or more databases, where each database can store data. In some examples, storage servers 110 can be a memory storage device, such as a hard disk. In some examples, storage servers 110 are part of a cluster 111, which may be a cloud-based cluster. In some examples, each of multiple customer computing devices 112, 114 can be a cellular phone, a smart phone, a tablet, a personal assistant device, a voice assistant device, a digital assistant, a laptop, a computer, or any other suitable device. In some examples, storage management device 102, web server 104, and storage servers 110 are operated by a retailer, and multiple customer computing devices 112, 114 are operated by customers of the retailer.

Workstation(s) 106 are operably coupled to communication network 118 via router (or switch) 108. Workstation(s) 106 and/or router 108 may be located at a store 109, for example. Workstation(s) 106 can communicate with storage management device 102 over communication network 118. The workstation(s) 106 may send data to, and receive data from, storage management device 102. For example, the workstation(s) 106 may transmit data related to an order purchased by a customer (e.g., transaction data) at store 109 to storage management device 102.

In some examples, web server 104 hosts one or more web pages, such as a retailer's website. Web server 104 may transmit data related to an order purchased on the website by a customer (e.g., transaction data) to storage management device 102.

Multiple customer computing devices 112, 114 may communicate with web server 104 over communication network 118. For example, each of multiple customer computing devices 112, 114 may be operable to view, access, and interact with webpages hosted by web server 104. In some examples, web server 104 hosts a web page for a retailer that allows for the purchase of items. For example, the web page may list prices for advertised items. An operator of one of multiple computing devices 112, 114 may access the web page hosted by web server 104, add one or more items to an online shopping cart of the web page, and perform an online checkout of the shopping cart to purchase the items.

Although FIG. 1 illustrates two customer computing devices 112, 114, data management system 100 can include any number of customer computing devices 110, 112, 114. Similarly, data management system 100 can include any number of workstation(s) 106, storage management devices 102, storage servers 110, web servers 104, and databases 116.

Storage management device 102 is operable to communicate with database 116 over communication network 118. For example, storage management device 102 can store data to, and read data from, database 116. Database 116 can be a remote storage device, such as a cloud-based server, a memory device on another application server, a networked computer, or any other suitable remote storage. Although shown remote to storage management device 102, in some examples, database 116 can be a local storage device, such as a hard drive, a non-volatile memory, or a USB stick.

Communication network 118 can be a WiFix network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Storage management device 102 may manage partitions controlled by storage servers 110. For example, storage management device 102 may create, resize, delete, and manipulate partitions controlled by storage servers 110. For example, storage servers 110 may include one or more hard disks that storage management device 102 may partition. In some examples, storage servers 110 are configured to control one or more databases. In these examples, storage management device may manage partitions within the databases via communication with the corresponding storage server 110.

In some examples, storage management device 102 assigns partitions (e.g., logical partitions) to a plurality of storage servers 110, such as storage servers 110A, 110B, 110C, 110D, 110E, 110F, which may be part of a cluster 111. In some examples, one or more storage servers 110 is assigned one partition. In some examples, one or more storage servers 110 is assigned multiple partitions. The amount of memory available for data storage in each partition is based on the total amount of available memory provided be a particular storage server 110, and the number of assigned partitions. In some examples, each assigned partition for a particular storage server 110 includes the same, or nearly the same, amount of memory. Storage management device 102 may store the partition assignments in database 116, for example.

In some examples, storage management device 102 receives memory requests (e.g., memory read or write requests) to the partitions controlled by storage servers 110. For example, storage management device 102 may receive a request, from web server 104 or from store 109, to store transaction data in one or more storage servers 110. Similarly, storage management device 102 may receive a request, from web server 104 or from store 109, to retrieve transaction data from one or more storage servers 110. Storage management device 102 may be operable to determine, based on the request, the partition for the memory request, and may satisfy the request based on the determined partition (e.g., may store the data to the correct partition, or may provide the data from the correct partition).

In some examples, storage management device 102 configures one or more storage servers 100 to include redundant partitions. For example, storage management device 102 may obtain partition data from a storage server 100, such as storage server 110A, with one or more active partitions (e.g., partitions available for data storage and retrieval), and store the obtained partition data in a database, such as database 116. Storage management device 102 may configure another storage server 110, such as storage server 110E, to include one or more partitions. Storage management device 102 may then provide the obtained partition data (e.g., either directly or from database 116) to the other storage server 100 to be stored in one or more of the configured partitions. Storage management device 102 may manage the partition in the other storage server 100 as a redundant partition. For example, if storage management device 102 receives a memory request, storage management device 102 may first attempt to satisfy the memory request by attempting to access an active partition (e.g., the partition in storage server 110A, in the example from above). If storage management device 102 is unable to satisfy the request (e.g., a memory access timeout or error condition occurs), storage management device 102 may attempt to satisfy the memory request by accessing the redundant partition (e.g., the partition in storage server 110E, in the example from above).

In some examples, when new storage servers 110 are made available (e.g., storage servers 110 that previously did not provide active or redundant partitions), storage management device 102 may repartition active (e.g., currently available) storage servers 110 and the new storage servers 110, and rebalance data among the current and new storage servers 110. For example, storage management device 102 may provide at least a portion of data from each partition of a current storage server 104 to a new storage server 110 to be stored in one of its partitions. For example, storage management device 102 may store half the data in a current partition, such as one currently assigned a partition identification (ID), in a new partition controlled by the new storage server 111. In some examples, store management device 102 deletes the data from the active partition that was copied to the new partition, and assigns a new partition ID for the new partition. As such, the original partition would have additional memory available for data storage based on the amount of data moved to the new partition. For example, assuming the partition was full (e.g., all memory was utilized), after moving half of the data to a new partition, the original partition would have approximately half of the partition's memory available.

Storage management device 102 may also update an address translation table such that memory requests for data are handled based on which partition the data now resides.

For example, storage management device 102 may direct memory requests for data that was moved to the new partition to the new storage server 110, and may direct memory requests for data that was not moved to the new partition to the original storage server 110.

Among other advantages, data management system 100 may allow for a number of active partitions to be increased in real time while reducing the amount of data distribution (e.g., data rebalancing) among the increased active partitions. As a result, the time required to rebalance the data among the partitions is reduced. The repartitioning may allow partition memory access efficiencies to be improved, such as the reduction of partition memory access times. Persons of ordinary skill in the arm having the benefit of the present disclosures will recognize additional advantages as well.

Figure 2:
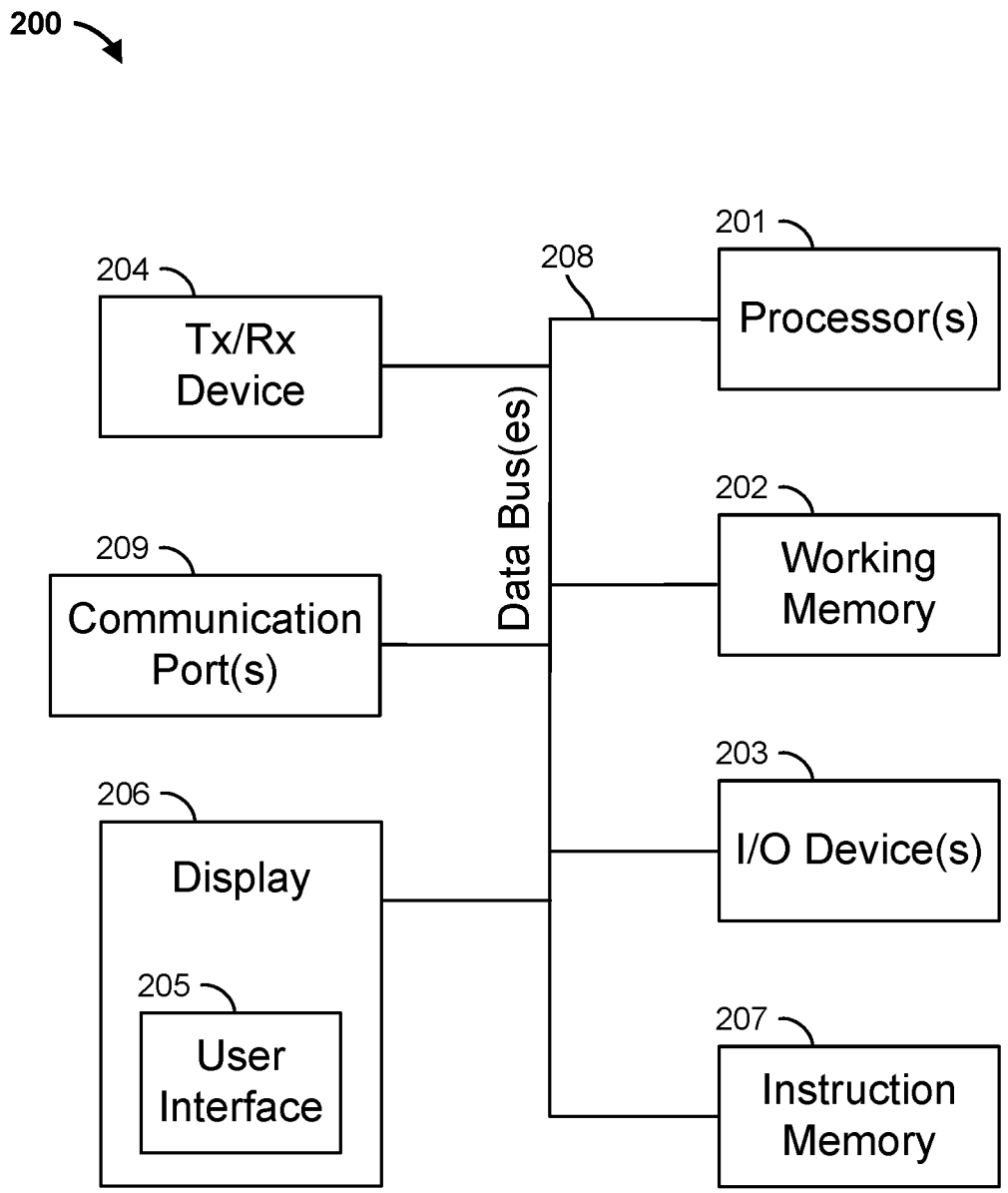
FIG. 2 is a block diagram of the storage management device of the data management system of FIG. 1 in accordance with some embodiments.

FIG. 2 illustrates the storage management device 102 of FIG. 1. Storage management device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of storage management device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allows for the transfer (e.g., uploading or downloading) of data, such as partition assignment data.

Display 206 can display user interface 205. User interfaces 205 can enable user interaction with storage management device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 storage management device 102 will be operating in. Processor(s) 201 is operable to receive data from, or send data to, a network, such as communication network 118 of FIG. 1, via transceiver 204.

Figure 3A:
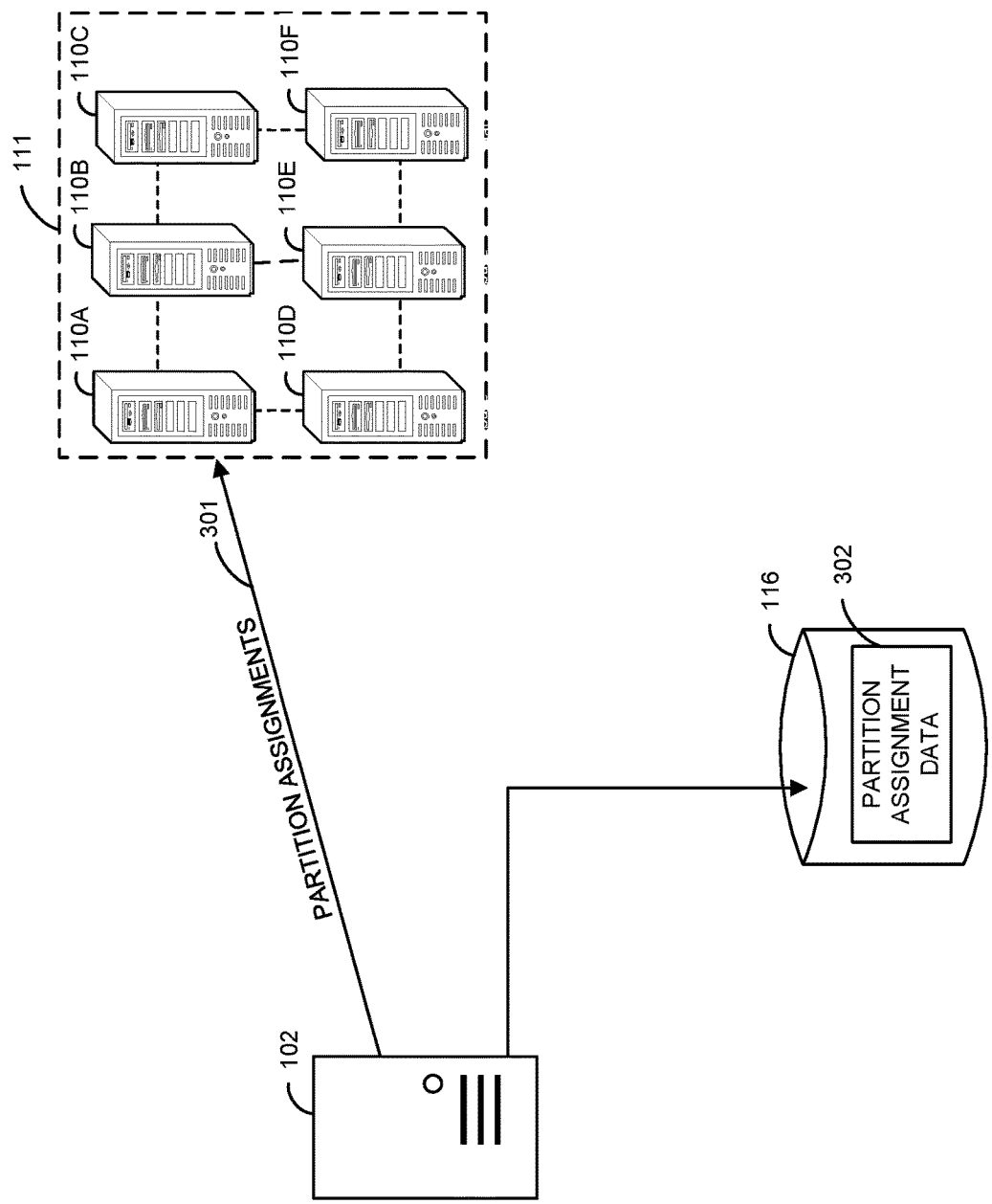
FIG. 3A is a block diagram illustrating examples of various portions of the data management system of FIG. 1 in accordance with some embodiments.

FIG. 3A is a block diagram illustrating examples of various portions of the data management system 100 of FIG. 1. As indicated in the figure, storage management device 102 may provide partition assignments 301 to one or more storage servers 110 of cluster 111. Although only one cluster 111 is illustrated, storage management device 102 may similarly provide partition assignments to additional clusters. Storage management device 102 may also store partition assignment data 302 in database 116, which identifies current partition assignments to one or more storage servers 110 in one or more clusters 111. Partition assignment data 302 may identify, for example, partitions corresponding to one or more storage servers 110.

Based on receiving partition assignments 301, a storage server 110 may initially partition, or reparation, its memory (e.g., disk space, hard disk space). For example, assume storage server 110A has 500 gigabytes (GB) of total disk space. Storage management device 102 may generate partition assignments 301 for storage server 110A to partition its disk space into two equal partitions, such that each partition will include 250 GB of disk space. In some examples, storage management device 102 generates partition assignments 301 to partition its disk space into unequal partitions. For example, may generate partition assignments 301 for storage server 110A to partition its disk space into one partition of 100 GB, and two partitions of 200 GB each.

Referring back to the two equal partition example, storage management device 102 may assign a partition ID to each of the two partitions. For example, storage management device 102 may assign a partition ID of 0 to the first of the two partitions (e.g., the lower half of the addresses for the disk space), and a partition ID of 1 to the second of the two partitions (e.g., the upper half of the addresses for the disk space). Storage management device 102 may store the assigned partition IDs as partition assignment data 302 in database 116. Partition assignment data 302 may also identify an address translation table, such that a memory request for data to be read from, or stored to, a partition is properly routed, as described in further detail below with respect to FIG. 5.

Storage management device 102 may allow for the use of each partition, such as by allowing the storing of transaction data to each partition. For example, storage management device 102 may store transaction data from web server 104 to the first partition (e.g., partition 0), and transaction data from store 109 to the second partition (e.g., partition 1).

Storage management device 102 may also repartition one or more storage servers 110. For example, in continuing the example from above, storage management device 102 may generate partition assignments 301 for storage server 110A to partition its first partition (e.g., partition 0) into two equal partitions (e.g., 125 GB each), and to partition its second partition (e.g., partition 1) into four equal partitions (e.g., 62.5 GB each). Storage management device 102 may then reassign partition IDs. For example, storage management device 102 may assign partition ID 0 and partition ID 1 to each of the two equal partitions, respectively. Storage management device 102 may also assign partition IDs 2, 3, 4, and 5 to the four equal partitions, respectively. Storage management device 102 may update partition assignment data 302 in database 116, and may update the address translation table, to reflect the new assigned partition assignments.

Figure 3B:
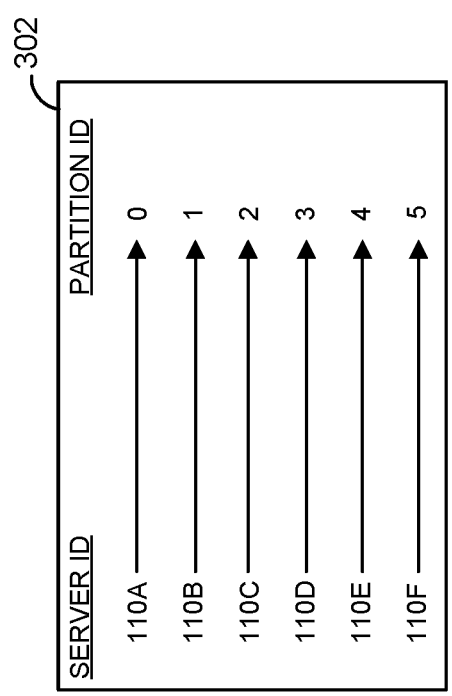
FIGS. 3B and 3C illustrate examples of partition assignments in accordance with some embodiments.

FIG. 3B shows an example of at least portions of partition assignment data 302. This example illustrates a listing (e.g., mapping) of partitions to storage servers 110. Specifically, each partition ID maps to (e.g., located with) one storage server 110. For example, as indicated in the figure, partition ID 0 maps to server ID 110A. Similarly, partition ID 1 maps to server ID 110B; partition ID 2 maps to server ID 110C; partition ID 3 maps to server ID 110D; partition ID 4 maps to server ID 110E; partition ID 5 maps to server ID 110F.

Figure 3C:
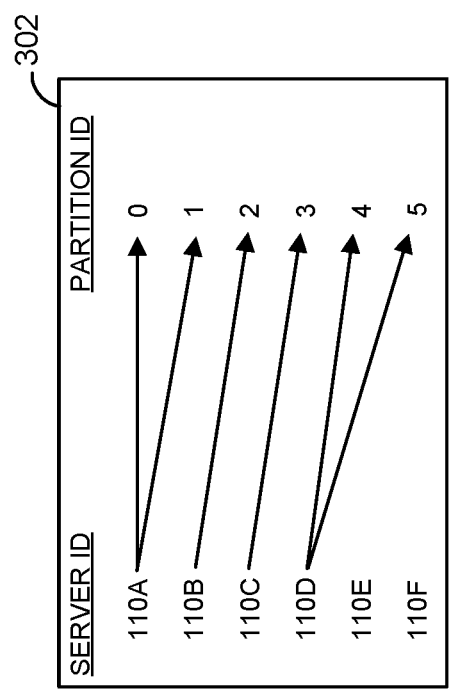

FIG. 3C illustrates another example of at least portions of partition assignment data 302. In this example, while some storage servers 110 are assigned multiple partitions, some storage servers 110 aren't assigned any partitions. Specifically, partition ID 0 and partition ID 1 map to storage server 110A. Partition ID 2 maps to storage server 110B, partition ID 3 maps to storage server 110C, and partition IDs 4 and 5 map to storage server 110D. Storage servers 110E and 110F, however, are not assigned to any partitions. For example, storage servers 110E and 110F may be inactive, and thus comprise no active partitions. In some examples, storage management device 102 may repartition storage servers 110 such that one or more storage servers 110, such as storage servers 110E and 110F in this example, include no active partitions. As such, the storage servers 110 may be tested, fixed, or replaced.

Figure 4A:
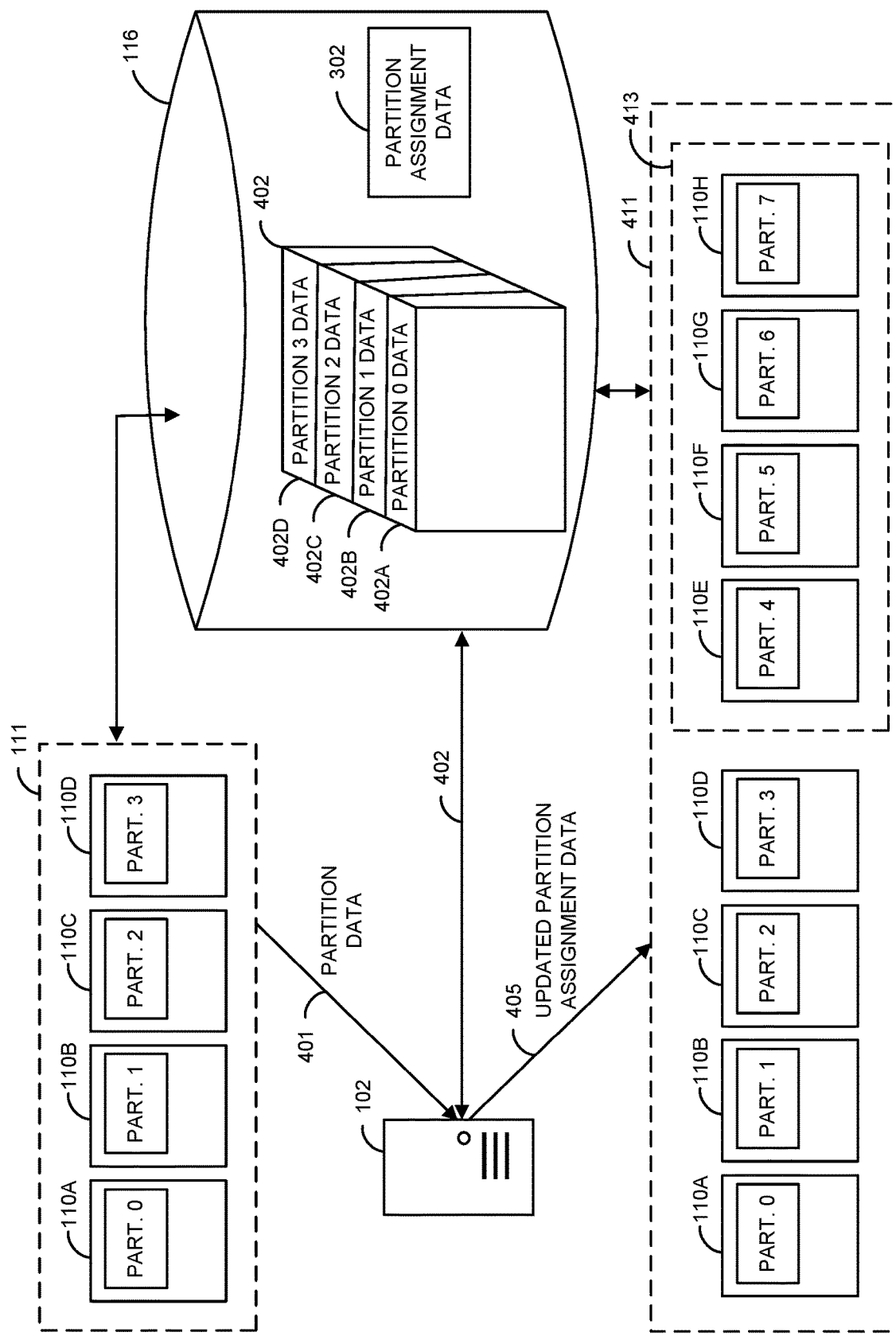
FIGS. 4A and 4B are block diagrams illustrating examples of various portions of the data management system of FIG. 1 in accordance with some embodiments.

FIG. 4A illustrates examples of various portion of the storage management device 102 of FIG. 1. As indicated in FIG. 4A, cluster 111 in this example includes storage servers 110A, 110B, 110C and 110D. For this example, assume that cluster 111 is an active cluster (e.g., is currently being used for the storage of data). For example, partition assignment data 302, stored in database 116, may indicate that storage server 110A currently holds partition ID 0. Partition assignment data 302 may also indicate that storage server 110B currently holds partition ID 1; that storage server 110C currently holds partition ID 2; and that storage server 110D currently holds partition ID 4.

In some examples, storage management device 102 is operable to configure partitions as redundant partitions. For example, assume that storage servers 110E, 110F, 110G, and 110H are available and have available disk space for at least one partition (e.g., to store as much data as the partitions currently assigned to partition IDs 0, 1, 2, and 3). Storage management device 102 may receive partition data from one or more storage servers 110 of cluster 111. For example, storage management device 102 may request partition data (e.g., data stored in a particular partition) for partition IDs 0, 1, 2, or 3 stored storage servers 110A, 110B, 110C, and 110D, respectively. Storage management device 102 may request from storage server 110A partition data for partition ID 0, and store the partition data in database 116 as partition 0 data 402A. Similarly, storage management device 102 may request from storage server 110B partition data for partition ID 1, and store the partition data in database 116 as partition 1 data 402B. Storage management device 102 may also request from storage server 110C partition data for partition ID 2, and store the partition data in database 116 as partition 2 data 402C. Storage management device 102 may also request from storage server 110D partition data for partition ID 3, and store the partition data in database 116 as partition 3 data 402D.

Storage management device 102 may repartition storage servers 110E, 110F, 110G, and 110H. For example, storage management device 102 may generate updated partition assignment data 405, which when provided to one of storage servers 110E, 110F, 110G, and 110H, configures the storage server 110 with one or more partitions. For example, storage management device 102 may provide updated partition assignment data 405 to storage server 110E to configure a partition on the storage server 110E, which may be assigned to partition ID 4. Similarly, storage management device 102 may configure a partition on storage server 110F, which may be assigned to partition ID 5. Storage management device 102 may also configure a partition on storage server 110G, which may be assigned to partition ID 6, and storage management device 102 may configure a partition on storage server 110H, which may be assigned to partition ID 7.

To configure storage servers 110E, 110F, 110G, and 110H as redundant storage servers, storage management device 102 may store partition data 402 corresponding to an active partition to a partition of storage servers 110E, 110F, 110G, and 110H. For example, storage management device 102 may obtain partition 0 data 402A from database 116 and provide it to storage server 110E for storage into partition ID 4. When completed, partition ID 0 and partition ID 4 would have stored the same data. Similarly, storage management device 102 may obtain partition 1 data 402B from database 116 and provide it to storage server 110F for storage into partition ID 5. When completed, partition ID 1 and partition ID 5 would have stored the same data. Storage management device 102 may also obtain partition 2 data 402C from database 116 and provide it to storage server 110G for storage into partition ID 6. When completed, partition ID 2 and partition ID 6 would have stored the same data. In addition, storage management device 102 may obtain partition 3 data 402D from database 116 and provide it to storage server 110H for storage into partition ID 7. When completed, partition ID 3 and partition ID 7 would have stored the same data.

Storage management device 102 may then manage storage servers 110E, 110F, 110G, and 110H as redundant storage servers. As indicated in the figure, storage servers 110A, 110B, 110C, 110D, 110E, 110F, 110G, and 110F may be part of new cluster 411. New cluster 411 includes redundant storage servers 413, which in this example comprises storage servers 110E, 110F, 110G, and 110H.

For example, storage management device 102 may receive a request for data stored in an active partition, such as the partition identified by partition ID 0. In response, storage management device 102 may determine whether the active partition is available. For example, storage management device 102 may attempt to satisfy the memory request by attempting to access the partition. If storage management device 102 is unable to satisfy the memory request (e.g., a memory access timeout or error condition occurs), storage management device 102 may attempt to satisfy the memory request by accessing the redundant partition, in this example, the partition identified by partition ID 4.

In some examples, storage management device 102 may determine that the active partition is unavailable based on a previous setting. For example, a user may provide an indication, such as a configuration setting, that an active partition or, more generally, a storage server 110 is unavailable. The user may provide the indication via user interface 205, for example. The user may set the configuration setting if the corresponding storage server 110 is being tested, fixed, or replaced, for example. When receiving a memory request for a particular partition, storage management device 102 may first access the configuration setting to determine if it indicates the active partition is down (e.g., offline). If storage management device 102 determines that the active partition is down, storage management device 102 may access the redundant partition to satisfy the memory request. Otherwise, if the active partition is available, storage management device 102 may attempt to satisfy the memory request by accessing the active partition.

Figure 4B:
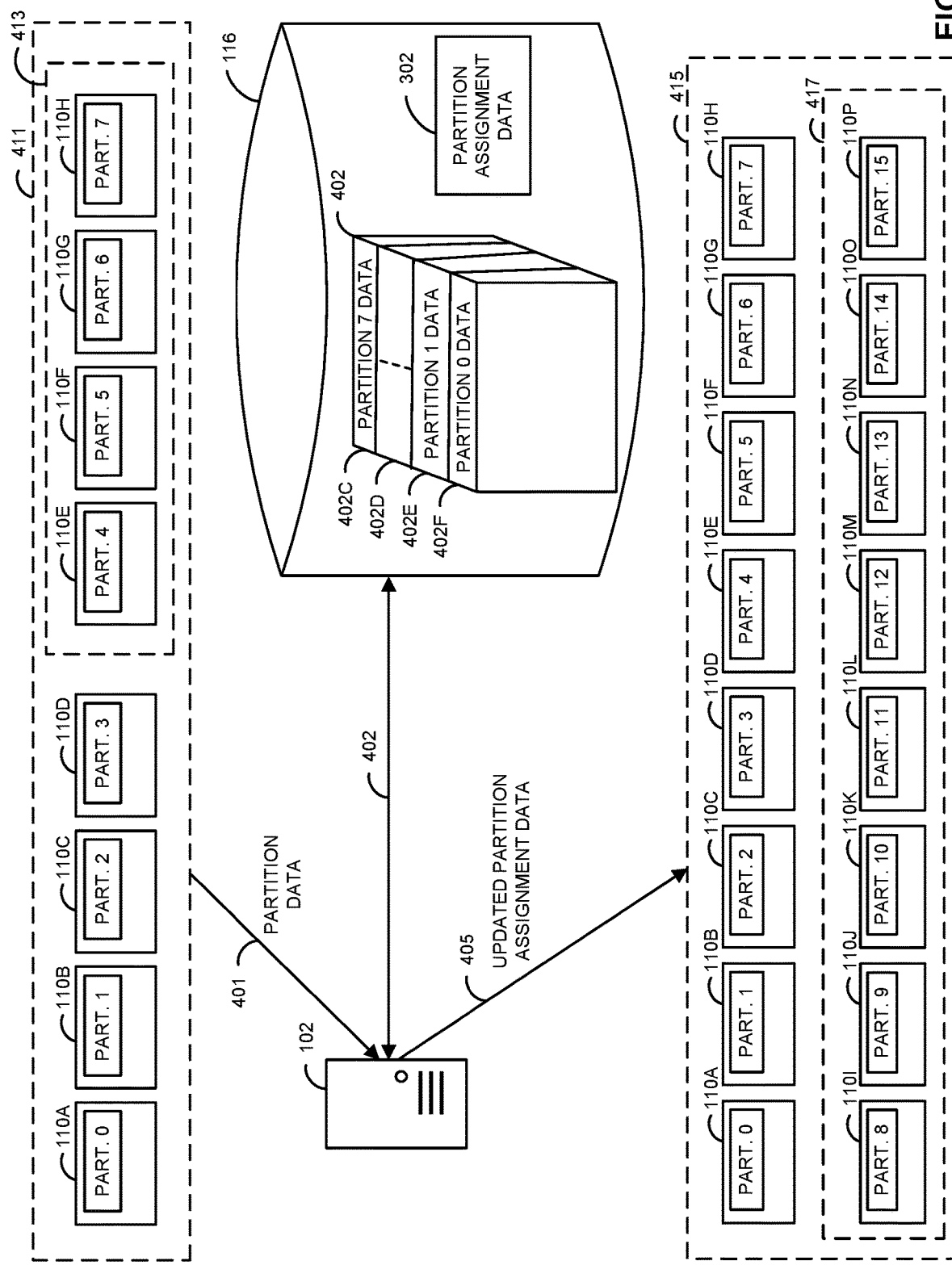

FIG. 4B illustrates an example of repartitioning and data distribution (e.g., data rebalancing) of the partition data of the storage servers 110 of cluster 413. Specifically, in this example, storage management device 102 configures partitions of storage servers 110 of cluster 411 and partitions of storage servers 110 of redundant storage servers 417 of newly created cluster 415. For example, assume that cluster 411 is active, with redundant storage servers 413 operating redundant partitions to storage servers 110A, 110B, 110C, and 110D, as described above with respect to FIG. 4A. Further, partition assignment data 302 may indicate the partition IDs associated with each storage server 110 of cluster 411. In addition, assume that the number of available storage servers 110 doubles. In other words, rather than having only the eight storage servers 110 of cluster 411, another eight storage servers (e.g., storage servers 110I, 110J, 110K, 110L, 110M, 110N, 110O, and 110P) become available (e.g., they are new storage servers being added).

Storage management device 102 may obtain partition data 401 for one or more of the storage servers 110 of cluster 411. For example, storage management device 102 may obtain partition 0 data 402A from storage server 110A, and store partition data 402A in database 116. Similarly, storage management device 102 may obtain partition 1 data 402B from storage server 110B, and store partition data 402B in database 116. Storage management device 102 may also obtain partition 2 data 402C from storage server 110C, and store partition data 402C in database 116. Storage management device 102 may obtain partition 3 data 402D from storage server 110D, and store partition data 402D in database 116.

Storage management device 102 may also configure and assign a partition ID to each newly available storage servers 110I, 110J, 110K, 110L, 110M, 110N, 110O, and 110P. For example, storage management device 102 may configure each of the newly available storage servers 110I, 110J, 110K, 110L, 110M, 110N, 110O, and 110P with a logical partition. For example, storage management device 102 may configure storage server 110I with partition ID 8. Similarly, storage management device 102 may configure: storage server 110J with partition ID 9; storage server 110K with partition ID 10; storage server 110L with partition ID 11; storage server 110M with partition ID 12; storage server 110N with partition ID 13; storage server 110O with partition ID 14; and storage server 110P with partition ID 15. These storage servers 110, along with the storage servers of previous cluster 411, now form storage servers 110 of newly created cluster 415.

To redistribute the data among the storage servers 100 of newly created cluster 415, storage management device 102 may delete a portion of data in one or more of the storage servers 110 that formed previous cluster 411. For example, storage management device 102 may delete a portion of data from each primary partition, and delete a differing portion of data from each primary partition's corresponding redundant partition. As an example, in FIG. 4A, partition ID 4, assigned to storage server 110E, was a redundant partition to partition ID 0, assigned to storage server 110A. Storage management device 102 may delete half of the data in partition ID 0, and the non-corresponding half of data in partition ID 4. As a result, while half of each partition's data was deleted, all of the data remains available, with half of the data residing in partition ID 0, and the other half in storage server 110E at partition ID 4.

Similarly, storage management device 102 may delete a portion of the data in partition ID 1, and the non-corresponding portion of data in partition ID 5. Storage management device 102 may delete a portion of the data in partition ID 2, and the non-corresponding portion of data in partition ID 6. Storage management device 102 may also delete a portion of the data in partition ID 3, and the non-corresponding portion of data in partition ID 7. As such, each of partition IDs 0 through 7 have half of the partitions memory available for additional data storage while maintaining partition data integrity.

In some examples, storage management device 102 updates partition data 402 with partition data from each partition of cluster 411. For example, partition 4 data, partition 5 data, partition 6 data, and partition 7 data from storage servers 110E, 110F, 110G, and 110H, respectively, and store the obtained partition data in database 116 as partition 4 data 402E, partition 5 data 402F, partition data 402G, and partition data 402H, respectively.

To establish redundant partitions, storage management device 102 may store partition data from each of partition ID 0 through partition ID 7 into a corresponding partition of a redundant storage server 417. For example, storage management device 102 may obtain partition data from each partition of each storage server 110 of cluster 411, and update partition data 402 in database 116. For example, storage management device 102 may obtain partition 0 data from storage server 110A, and store it as partition 0 data 402A in database 116. Similarly, storage management device 102 may obtain partition 1 data, partition 2 data, partition 3 data, partition 4 data, partition 5 data, partition 6 data, and partition 7 data from storage servers 110B through 110H, respectively. Storage management device 102 may store the obtained partition data in database 116 as partition 1 data 402B, partition 2 data 402C, partition 3 data 402D, partition 4 data 402E, partition 5 data 402F, partition data 402G, and partition data 402H, respectively.

To create redundant partitions, storage management device 102 may provide partition data 402 to one or more storage servers 110 of redundant storage servers 417. For example, storage management device 102 may obtain partition 0 data 402A from database 116, and provide it to storage server 110I for storage into partition ID 8. Similarly, storage management device 102 may obtain partition 1 data 402B from database 116, and provide it to storage server 110J for storage into partition ID 9. Storage management device may also obtain partition 2 data 402C, partition 3 data 402D, partition 4 data 402E, partition 5 data 402F, partition 6 data 402G, and partition 7 data 402D from database 116, and provide the partition data to storage servers 110K through 110P, respectively, for storage into partition IDs 10 through 15, respectively. As a result, storage management device 102 may operate partition IDs 8 through 15 of storage servers 110I through 110P, respectively, as redundant partitions to partition IDs 0 through 7.

In some examples, the number of partitions available to data management system 100 are doubled. For example, if there are eight active partitions, another eight are added to create a total of sixteen partitions. As a result, storage management device 102 may rebalance data among all of the partitions. For example, at least a portion of data from each of the original partitions may be moved to another partition (e.g., copied and deleted from the original partition, and stored in the other partition). If the number of available partitions is doubled, half of the partition data from each original partition may be moved to a new partition. In some examples, the number of partitions to data management system 100 may be increased by other amounts, such as tripled, quadrupled, or any amount. If tripled, for example, a third of the partition data may be moved to a new partition, and another third may be moved to another new partitions. If quadrupled, one fourth of the partition data of the original partition may be moved to a first new partition, another one fourth of the partition data of the original partition may be moved to a second new partition, and yet another one fourth of the original partition may be moved to a third new partition.

Figure 5:
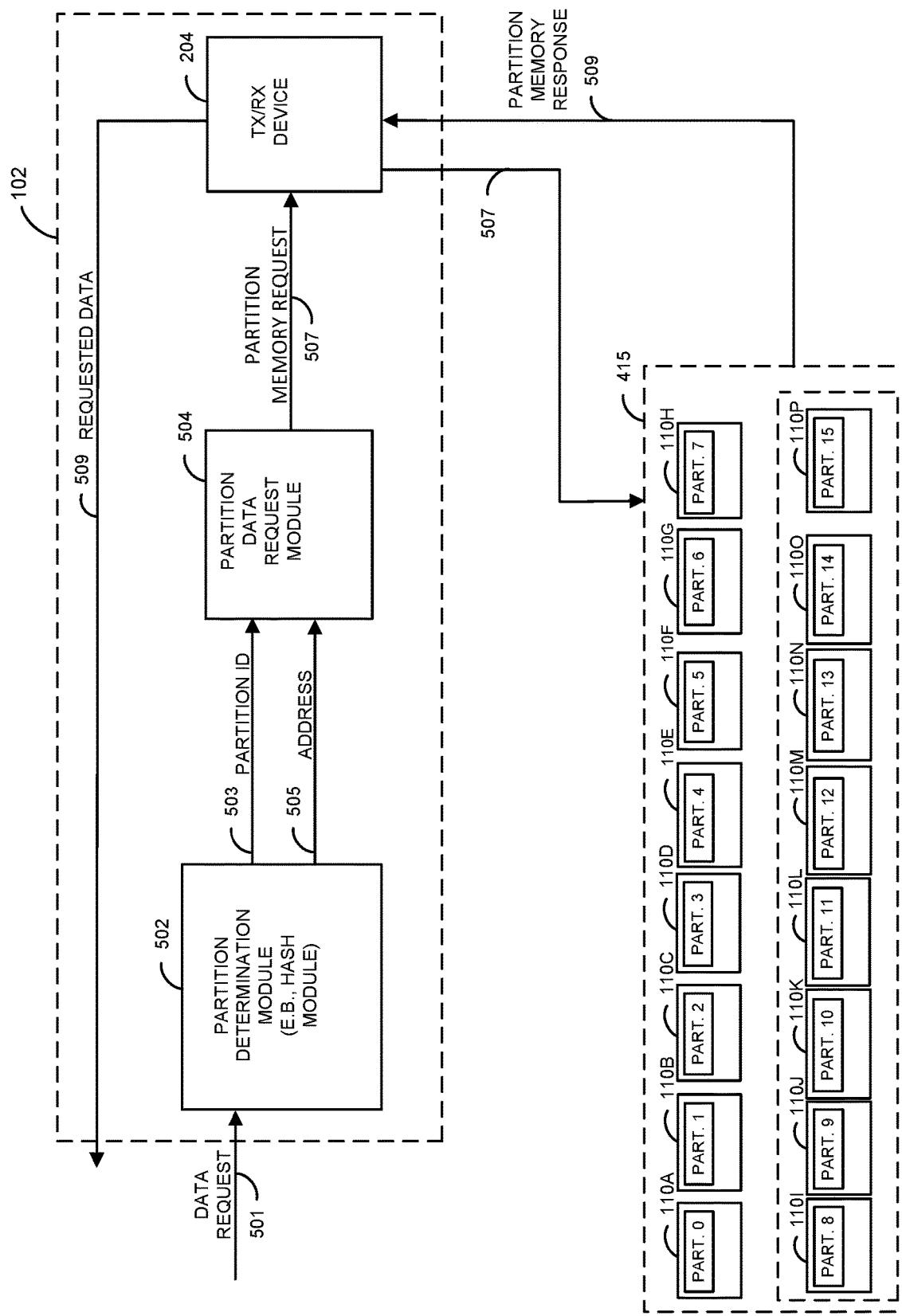
FIG. 5 is a block diagram of portions of the storage management device of the data management system of FIG. 1 in accordance with some embodiments.

FIG. 5 illustrates exemplary portions of storage management device 102 of the data management system 100 of FIG. 1. In this example, storage management device 102 includes partition determination module 502 and partition data request module 504. Each of partition determination module 502 and partition data request module 504 may be implemented in hardware (e.g., one or more FPGAs, one or more ASICS), in executable instructions executed by a processor, or in any combination of the two.

In this example, storage management device 102 is configured to receive a memory request 501 identifying a memory request (e.g., data read or data write) for a storage server 110 partition. Storage management device 102 may determine the partition for the memory request based on an address translation table, which may be implemented by partition determination module 502. For example, partition determination module 502 may store or have access to an address translation table that maps a memory address identified by memory request 501 to a logical partition, such as a partition identified by one of partition IDs 0 through 7. The address trnalation table may include, for example, a minimum address and a maximum address of each logical partition, assuming the partitions are mapped to different ranges of memory address. Partition determination module 502 may determine which partition's address range the memory address for the memory request falls within. If the memory address falls within a particular partitions minimum and maximum memory addresses, partition determination module 502 determines that the memory request is for that partition. Partition determination module 502 may generate partition ID 503 identifying the partition.

In some examples, partition determination module 502 implements a hash algorithm to identify partition ID 503 for memory request 501. For example, partition determination module 402 may implement the following equation:

$$\text{partition ID} = \text{address} \ \% \ N; \qquad \text{(eq. 1)}$$

where:

partition ID is the partition ID for the memory request;
address is the memory address identified by memory request 501;
N is a number of available partitions (e.g., active partitions).

For example, if there are eight available partitions (e.g., partitions 0 through 7 associated with storage servers 110A through 110H), N would equal eight. Partition determination module 402 would execute equation 1 to determine partition ID 503 pertaining to the memory address identified by memory request 501.

In addition, partition determination module 502 generates address 505 identifying a memory address within the partition identified by partition ID 503. In some examples, address 505 is at least a portion of the memory address associated with memory request 501 (e.g., a lower number of bits, such as ten, of the memory address). In some examples, partition determination module 502 includes an address translation table that translates the memory address identified by memory request 501 into a memory address suitable for the storage server 110 that holds the partition assigned to partition ID 503.

Partition data request module 504 receives partition ID 503 and address 505 from partition determination module 502, and generates partition data request 507 identifying and characterizing the memory request for the determined partition ID 503. For example, partition data request module 504 may package partition ID 503 and address 505 into a partition memory request 507 suitable for transmission to the corresponding storage server 110 of cluster 415 (e.g., the storage server 110 associated with partition ID 503). Partition data request module 504 provides partition data request 507 to transceiver device 204 for transmission to the corresponding storage server 110.

Transceiver device 204 transmits partition memory request 507 to the corresponding storage server 110. In response, the corresponding storage server 110 satisfies the partition memory request and provides partition memory response 509. For example, if partition memory request 507 is a request to store data (e.g., a data write request), the corresponding storage server 110 stores the data identified by partition memory request 507 into the memory address identified by memory request 507 (e.g., address 505). The corresponding storage server 110 may then generate partition memory response 509, which may be an acknowledgement message, for example.

If partition memory request 507 is a request to read data (e.g., a data read request), the corresponding storage server 110 read data from the memory address identified by memory request 507 (e.g., address 505). The corresponding storage server 110 may then generate partition memory response 509, which may identify the read data, for example. Transceiver 204 receives and provides partition memory response data 509 in response to memory request 501.

Figure 6:
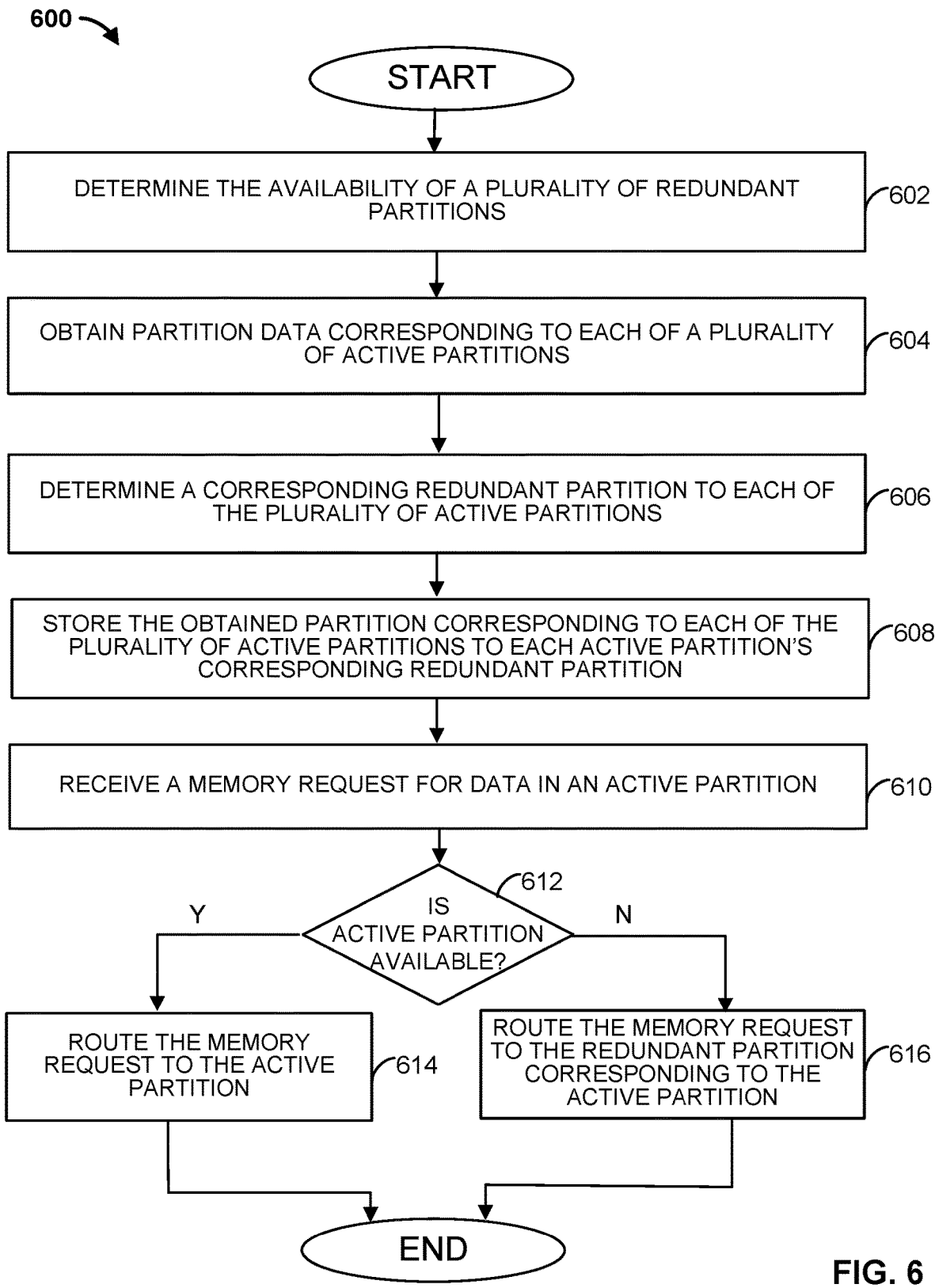
FIG. 6 is a flowchart of an example method that can be carried out by the data management system of FIG. 1 in accordance with some embodiments.

FIG. 6 is a flowchart of an example method 600 that can be carried out by the data management system 100 of FIG. 1. Beginning at step 602, a computing device, such as storage management device 102, determines the availability of a plurality of redundant partitions. For example, a user may provide an indication to storage management device 102 via user interface 205 that an additional number of storage servers 110, such as storage servers 110E, 110F, 110G, and 110H as described above with respect to FIG. 4A, are now available (e.g., can put configured onto cluster 411). At step 604, partition data corresponding to each of a plurality of active partitions is obtained. For example, storage management device 102 may obtain partition data 401 from storage servers 110 with active partitions, such as storage servers 110A, 110B, 110C, and 110D as described above with respect to FIG. 4A.

Proceeding to step 606, a corresponding partition to each of the plurality of active partitions is determined. For example, and as described above with respect to FIG. 4A, storage management device 102 may configure a partition on each of storage servers 110E, 110F, 110G, and 110H as a redundant partition to a partition on each of storage servers 110A, 110B, 110C, and 110D. In some examples, storage management device 102 assigns partition IDs and updates partition assignment data 302 in database 116 with the assigned partition IDs. At step 608, the obtained partition data corresponding to each of the plurality of active partitions is stored to each active partition's corresponding redundant partition.

At step 610, a memory request is received for data in an active partition. For example, storage management device 102 may receive memory request 501 to read data from, or write data to, a memory location of an active partition. At step 612, a determination is made as to whether the active partition is available. If the active partition is not available (e.g., it is offline), the method proceeds to step 616, where the memory request is routed to the redundant partition corresponding to the active partition. Otherwise, if at step 612 a determination is made that the active partition is available, the method proceeds to step 614, where the memory request is routed to the active partition. The method then ends.

Figure 7A:
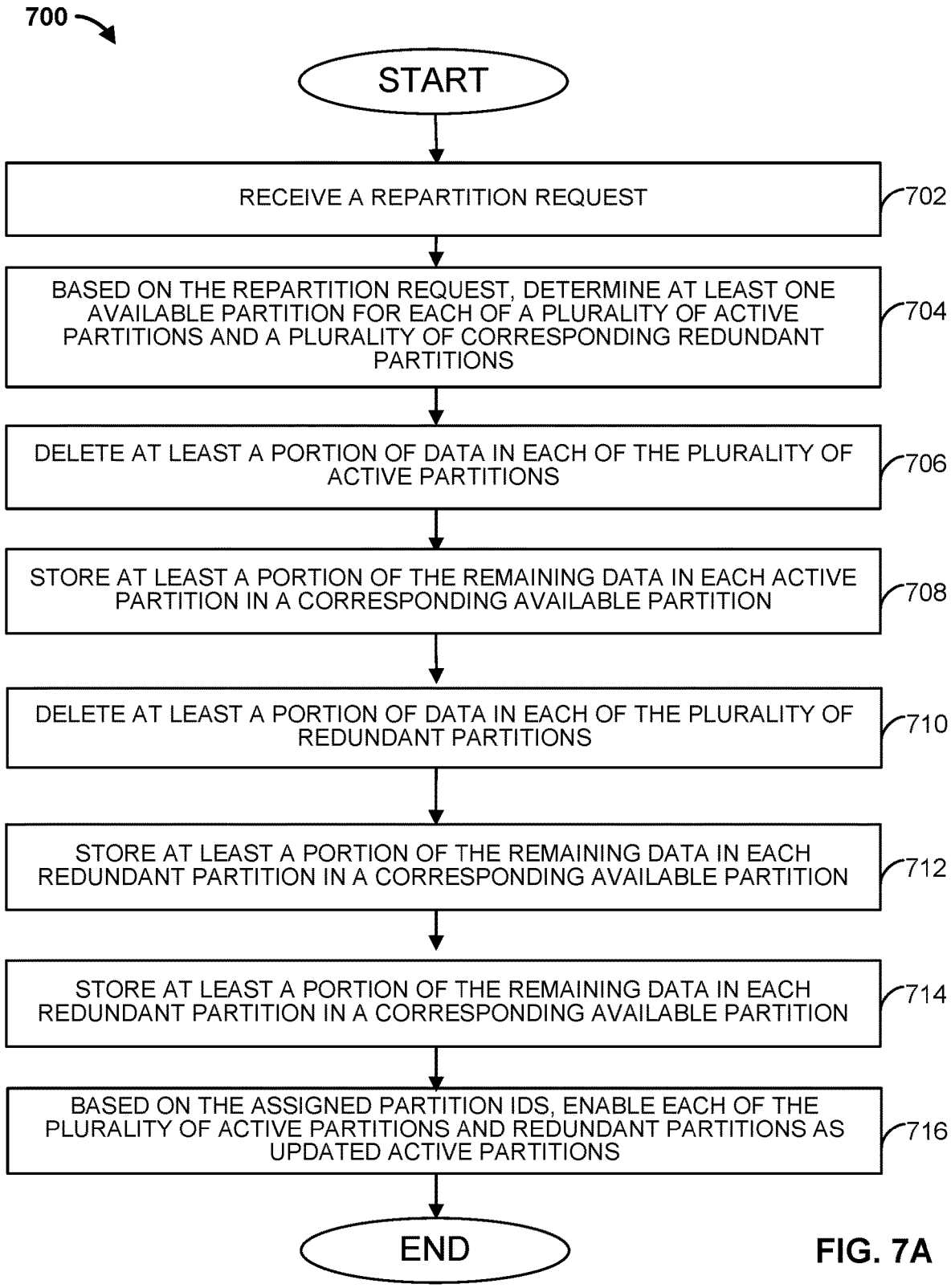
FIGS. 7A and 7B are flowcharts of other example methods that can be carried out by the data management system of FIG. 1 in accordance with some embodiments.

FIG. 7A is a flowchart of an example method 700 that can be carried out by the data management system 100 of FIG. 1. Beginning at step 702, a computing device, such as storage management device 102, receives a repartition request. For example, a user may provide, via user interface 205, data identifying and characterizing a request to repartition hard drives among one or more storage servers 110. At step 704, based on the repartition request, at least one available partition is determined for each of a plurality of active partitions and a plurality of corresponding redundant partitions. Each redundant partition stores partition data in accordance with partition data stored in its corresponding active partition (e.g., the partition data in an active partition and its corresponding redundant partition is the same). The repartition request may identify an additional number of storage servers 110, such as storage servers 110I through 110P as described above with respect to FIG. 4B, that are now available. Storage management device 102 may configure each of the now available storage servers with at least one partition, and assign each partition a partition ID.

At step 706, at least a portion of data in each of the plurality of active partitions is deleted. For example, storage management device 102 may cause each corresponding storage server 110 to delete, from each corresponding active partition, half of the data. For example, as described above with respect to FIG. 4B, storage management device 102 may cause each of storage servers 110A through 110D to delete half the data from each partition. As a result, each active partition now has additional available memory corresponding to the amount of partition data deleted.

At step 708, at least a portion of the remaining data in each of the plurality of active partitions is stored in a corresponding newly available partition. For example, storage management device 102 may obtain partition data 401 from each of the currently active partitions, such as partitions identified as partition IDs 0 through 3 located in storage servers 110A through 110D, respectively, as described above with respect to FIG. 4B. Partition data 401 may include, for example, the half of the data remaining in each respective active partition. Storage management device 102 may then store the portion of obtained partition data for each partition in an available partition, such as a partition of storage servers 110I through 110L as shown in FIG. 4B.

Proceeding to step 710, a portion of data in each of the plurality of redundant partitions is deleted. The portion of data that is deleted from each redundant partition corresponds to the portion of data that was not deleted from each corresponding active partition. For example, storage management device 102 may cause each corresponding storage server 110 to delete, from each corresponding active partition, half of the data. For example, as described above with respect to FIG. 4B, storage management device 102 may cause each of storage servers 110E through 110H to delete half the data from each partition. The data deleted corresponds to the half of data that was not deleted from the partitions of storage servers 110A through 110D. As a result, each redundant partition now has additional available memory corresponding to the amount of partition data deleted.

At step 712, the remaining portion of data in each of the plurality of redundant partitions is stored in a corresponding newly available partition. For example, storage management device 102 may obtain partition data 401 from each of the currently redundant partitions, such as partitions identified as partition IDs 4 through 7 located in storage servers 110E through 110H, respectively, as described above with respect to FIG. 4B. Partition data 401 may include, for example, half of the data currently stored in each respective redundant partition. The portion of data stored from each redundant partition may correspond to the portion of data in each active partition that was not deleted at step 710. Storage management device 102 may then store the portion of obtained partition data for each partition in an available partition, such as a partition of storage servers 110M through 110P as shown in FIG. 4B.

At step 714, an active partition ID is assigned to each of the plurality of active partitions and redundant partitions. For example, storage management device 102 may assign partition IDs 0 through 3 to storage servers 110A through 110D, respectively, which held previous active partitions (and still do), and may assign partition IDs 4 through 7 to storage servers 110E through 110H, respectively, which previously held redundant partitions.

At step 716, based on the assigned partition IDs, each of the plurality of active partitions and redundant partitions are enabled as active partitions. In other words, the plurality of active partitions and plurality of redundant partitions now all become active partitions (e.g., they are no longer redundant of each other, and available as separate partitions for data storage). In some examples, the available partitions are enabled as redundant partitions to these active partitions. For example, as described above with respect to FIG. 4B, storage management device 102 may configure partitions 8 through 15 of storage servers 110I through 110P, respectively, as redundant partitions to partitions 0 through 7 of storage servers 110A through 110H, respectively. The method then ends.

Figure 7B:
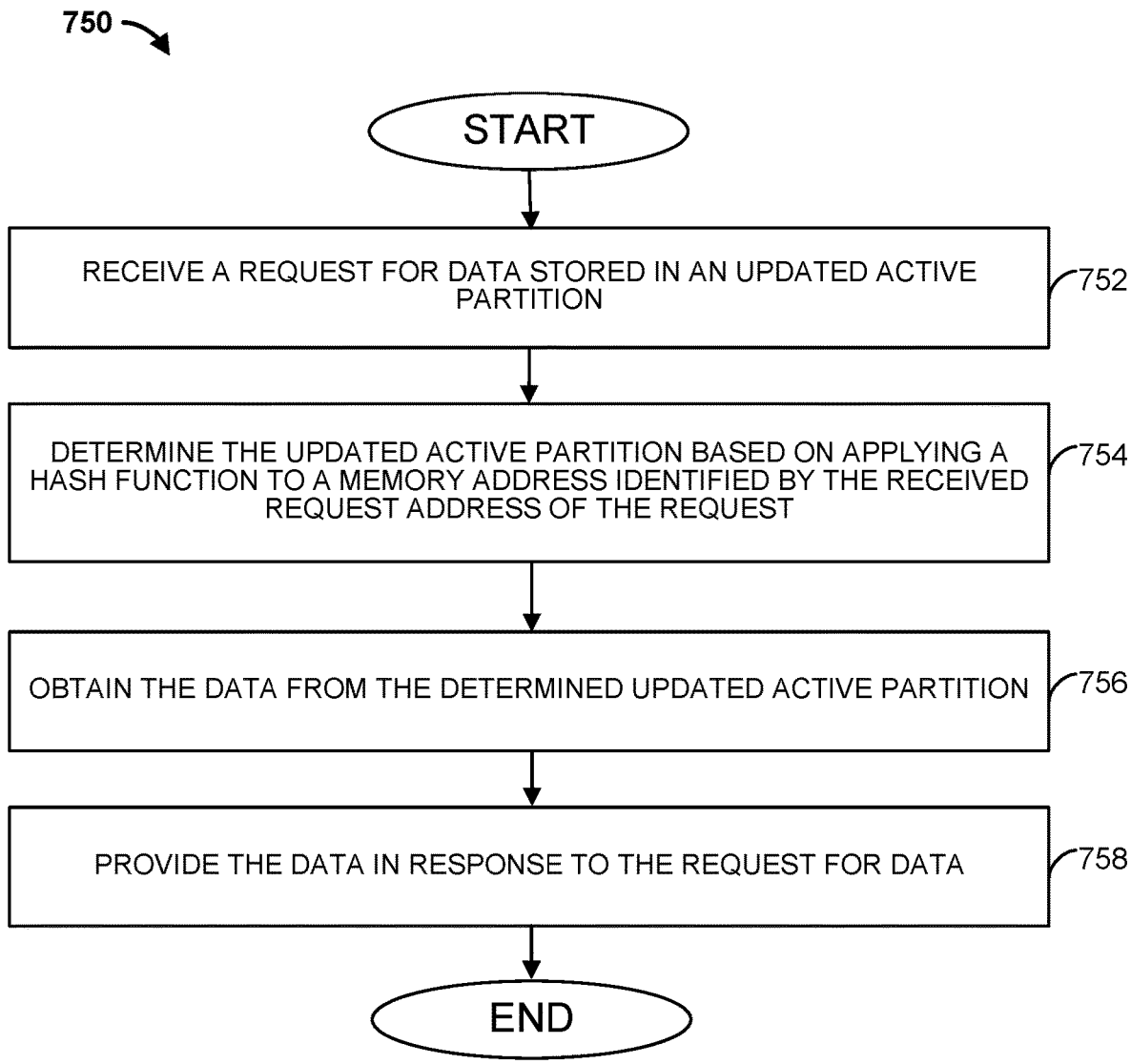

FIG. 7B is a flowchart of an example method 750 that can be carried out by the data management system 100 of FIG. 1. Beginning at step 752, a request for data stored in an updated active partition is received. For example, storage management device 102 may receive a memory request 501 as described above with respect to FIG. 5. The updated active partition may be one determined as described with respect to FIG. 7A above.

At step 754, the updated active partition is determined based on the application of a hash function to a memory address identified by the received request. For example, storage management device 102 may execute equation 1, described above, based on a number of active partitions and the memory address identified by the received request, to identify the partition for the request.

At step 756, data is obtained from the determined updated active partition. For example, storage management device 102 may receive, from the storage server 110 associated with the determined partition, partition data stored at the memory address identified by the request. At step 758, the obtained data is provide in response to the request for data. For example, storage management device 102 may provide partition memory request 507, which identifies the obtained data, in response to the received request. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a plurality of first memory partitions;
   a plurality of second memory partitions; and
   a computing device communicatively coupled to the plurality of first memory partitions and to the plurality of second memory partitions and configured to:
   determine at least one available memory partition from the plurality of second memory partitions for each of the plurality of first memory partitions;
   delete at least a portion of data in each of the plurality of first memory partitions wherein, after the deletion, there remains a remaining portion of data in each of the plurality of first memory partitions;
   store at least a portion of the remaining portion of data in each of the plurality of first memory partitions in the determined at least one available memory partition for each first memory partition;
   assign a partition identification (ID) to each of the plurality of first memory partitions; and
   configure the determined at least one available memory partition for each of the plurality of first memory partitions as a redundant memory partition to the corresponding first memory partition.

2. The system of claim 1, wherein the plurality of first memory partitions comprise a plurality of active memory partitions and a plurality of redundant partitions, wherein each redundant memory partition of the plurality of redundant memory partitions corresponds to an active memory partition of the plurality of active memory partitions, and wherein the computing device is configured to:
   delete at least the portion of data in each of the plurality of active memory partitions wherein after the deletion, there remains the remaining portion of data in each of the plurality of active memory partitions; and
   delete at least the portion of data in each of the plurality of redundant partitions corresponding to the remaining portion of data in each of the plurality of active memory partitions.

3. The system of claim 2, wherein the computing device is configured to:
   store at least the portion of the remaining portion of data in each of the plurality of active memory partitions in the determined at least one available memory partition for each active memory partition; and
   store at least the portion of the remaining portion of data in each of the plurality of redundant memory partitions in the determined at least one available memory partition for each redundant memory partition.

4. The system of claim 2 wherein the computing device is configured to:
   assign the partition identification ID to each of the plurality of active memory partitions and to the plurality of redundant memory partitions; and
   enable each of the plurality of redundant memory partitions as an active memory partition.

5. The system of claim 1, wherein the computing device is configured to receive a repartition request, and wherein determining the at least one available memory partition for each of the plurality of first memory partitions is in response to receiving the repartition request.

6. The system of claim 1, wherein the computing device is configured to:
   receive a memory request for the plurality of first memory partitions;
   determine a first memory partition of the plurality of first memory partitions based on the received memory request; and
   provide a partition memory request that causes the first memory partition to be accessed.

7. The system of claim 6, wherein the computing device is configured to determine the first memory partition based on an application of a hash function to a memory address identified by the memory request.

8. The system of claim 6, wherein the computing device is configured to:
   determine that the first memory partition is not available; and
   provide the partition memory request that causes the at least one available memory partition for the first memory partition to be accessed.

9. A method performed by at least one computing device communicatively coupled to a plurality of first memory partitions and a plurality of second memory partitions, comprising:
  determining at least one available memory partition from the plurality of second memory partitions for each of the plurality of first memory partitions;
  deleting at least a portion of data in each of the plurality of first memory partitions wherein, after the deletion, there remains a remaining portion of data in each of the plurality of first memory partitions;
  storing at least a portion of the remaining portion of data in each of the plurality of first memory partitions in the determined at least one available memory partition for each first memory partition;
  assigning a partition identification (ID) to each of the plurality of first memory partitions; and
  configuring the determined at least one available memory partition for each of the plurality of first memory partitions as a redundant memory partition.

10. The method of claim 9, wherein the plurality of first memory partitions comprise a plurality of active memory partitions and a plurality of redundant partitions, wherein each redundant memory partition of the plurality of redundant memory partitions corresponds to an active memory partition of the plurality of active memory partitions, and wherein the method further comprises:
  deleting at least the portion of data in each of the plurality of active memory partitions wherein after the deletion, there remains the remaining portion of data in each of the plurality of active memory partitions; and
  deleting at least the portion of data in each of the plurality of redundant partitions corresponding to the remaining portion of data in each of the plurality of active memory partitions.

11. The method of claim 10 further comprising:
  storing at least the portion of the remaining portion of data in each of the plurality of active memory partitions in the determined at least one available memory partition for each active memory partition; and
  storing at least the portion of the remaining portion of data in each of the plurality of redundant memory partitions in the determined at least one available memory partition for each redundant memory partition.

12. The method of claim 10 further comprising:
  assigning the partition identification ID to each of the plurality of active memory partitions and to the plurality of redundant memory partitions; and
  enabling each of the plurality of redundant memory partitions as an active memory partition.

13. The method of claim 9 further comprising receiving a repartition request, wherein determining the at least one available memory partition for each of the plurality of first memory partitions is in response to receiving the repartition request.

14. The method of claim 9 further comprising:
  receiving a memory request for the plurality of first memory partitions;
  determining a first memory partition of the plurality of first memory partitions based on the received memory request; and
  providing a partition memory request that causes the first memory partition to be accessed.

15. The method of claim 14 further comprising determining the first memory partition based on an application of a hash function to a memory address identified by the memory request.

16. The method of claim 14 further comprising:
  determining that the first memory partition is not available; and
  providing the partition memory request that causes the at least one available memory partition for the first memory partition to be accessed.

17. A non-transitory computer readable medium having instructions stored thereon wherein the instructions, when executed by at least one processor communicatively coupled to a plurality of first memory partitions and a plurality of second memory partitions, cause a device to perform operations comprising:
  determining at least one available memory partition from the plurality of second memory partitions for each of the plurality of first memory partitions;
  deleting at least a portion of data in each of the plurality of first memory partitions wherein, after the deletion, there remains a remaining portion of data in each of the plurality of first memory partitions;
  storing at least a portion of the remaining portion of data in each of the plurality of first memory partitions in the determined at least one available memory partition for each first memory partition;
  assigning a partition identification (ID) to each of the plurality of first memory partitions; and
  configuring the determined at least one available memory partition for each of the plurality of first memory partitions as a redundant memory partition.

18. The non-transitory computer readable medium of claim 17 wherein the plurality of first memory partitions comprise a plurality of active memory partitions and a plurality of redundant partitions, wherein each redundant memory partition of the plurality of redundant memory partitions corresponds to an active memory partition of the plurality of active memory partitions, and further comprising instructions stored thereon that, when executed by at least one processor, further cause the device to perform operations comprising:
  deleting at least the portion of data in each of the plurality of active memory partitions wherein after the deletion, there remains the remaining portion of data in each of the plurality of active memory partitions; and
  deleting at least the portion of data in each of the plurality of redundant partitions corresponding to the remaining portion of data in each of the plurality of active memory partitions.

19. The non-transitory computer readable medium of claim 18 further comprising instructions stored thereon that, when executed by at least one processor, further cause the device to perform operations comprising:
  storing at least the portion of the remaining portion of data in each of the plurality of active memory partitions in the determined at least one available memory partition for each active memory partition; and
  storing at least the portion of the remaining portion of data in each of the plurality of redundant memory partitions in the determined at least one available memory partition for each redundant memory partition.

20. The non-transitory computer readable medium of claim 18 further comprising instructions stored thereon that, when executed by at least one processor, further cause the device to perform operations comprising:
  assigning the partition identification ID to each of the plurality of active memory partitions and to the plurality of redundant memory partitions; and enabling each of the plurality of redundant memory partitions as an active memory partition.

* * * * *